United States Patent [19]
Holguin

[11] Patent Number: 5,458,492
[45] Date of Patent: Oct. 17, 1995

[54] STREET ATLAS HOLDER AND READER

[76] Inventor: Ernest Holguin, 24094 Atwood Ave., Moreno Valley, Calif. 92553

[21] Appl. No.: 215,368

[22] Filed: Mar. 21, 1994

[51] Int. Cl.⁶ .................................................. G09B 29/10
[52] U.S. Cl. ........................................ 434/153; 434/150
[58] Field of Search ...................... 434/153, 150, 434/130; 40/352, 353, 356, 904; 283/34, 35

[56] References Cited

U.S. PATENT DOCUMENTS

| | | |
|---|---|---|
| 1,759,544 | 5/1930 | Cross . |
| 2,729,908 | 1/1956 | Miller . |
| 2,791,040 | 5/1957 | Santorelli . |
| 2,891,314 | 6/1959 | Haschek ................. 434/153 X |
| 3,328,899 | 7/1967 | Stewart . |
| 3,553,864 | 1/1971 | Karlyn et al. . |
| 4,477,254 | 10/1984 | Yokayama . |
| 4,800,664 | 1/1989 | Marstall . |

FOREIGN PATENT DOCUMENTS

| | | | |
|---|---|---|---|
| 3043728 | 6/1962 | Germany .................. 434/153 |
| 3700096 | 7/1988 | Germany .................. 434/153 |
| 0179524 | 9/1922 | United Kingdom ............. 434/153 |

*Primary Examiner*—Paul J. Hirsch
*Assistant Examiner*—Jeffrey A. Smith
*Attorney, Agent, or Firm*—James G. O'Neill

[57] ABSTRACT

A portable holder for a street atlas is provided. The holder includes a hollow transparent body dimensioned to hold a street atlas and enable viewing of a page of the street atlas. A cover is pivotally coupled to the body. The cover includes a magnifying lens dimensioned to enhance viewing of an additional page of the street atlas. A retaining portion is attached to a bottom surface of the cover to retain the page. A locating mechanism for locating a specific area on the page of the street atlas is made integral with the cover and interposed between the retaining portion and the magnifying lens. The locating mechanism includes horizontal and vertical adjustment mechanisms that extend through a top surface of the cover and are disposed adjacent opposite sides of the cover. A target is coupled to the adjustment mechanisms for moving the target to a specific area on the page when the bands are adjusted horizontally and vertically. The target is locatable over substantially all of the second page of the street atlas.

15 Claims, 1 Drawing Sheet

STREET ATLAS HOLDER AND READER

BACKGROUND OF THE INVENTION

1. Field of the Invention

This invention relates generally to devices for holding maps, and more particularly, to an improved portable street atlas holder that enables viewing of at least one page of the atlas while enabling viewing of the atlas.

2. Description of Related Art

It is somewhat difficult to find and maintain a location on a map or atlas, particularly during transit in a vehicle, for a number of reasons. First, there are many distractions while operating or riding in the vehicle, such as traffic, other passengers in the vehicle, and road unevenness. These distractions may cause a user of the map to lose a desired location after one is found. Secondly, due to the number of streets, freeways, and points of interest, specially in urban areas shown on maps today, the density of features and size &typeface used to indicate names are often very difficult to decipher and read.

A number of prior art devices have attempted to solve these problems. U.S. Pat. No. 3,328,899, to Stewart, discloses a map holder comprising a completely flat transparent case with an open ended compartment. A map is inserted into the compartment with transparent indicator bars sliding along edges of the case cooperating to indicate a desired location on the map in the case.

U.S. Pat. No. 4,477,254, to Yokayama, discloses a foldable map with a present location indicator. The disclosed device includes a cover that comprises a front cover side and a back cover side. A map portion is folded in a specific way, with a paper reinforcer as a center line. The map is folded in the particular way then bonded to the cover. The present location indicator is freely slidable in a vertical direction only.

U.S. Pat. No. 4,800,664, to Marstall, discloses a map holder directed to a motorcycle or bicycle. The disclosed device has a compartment with a pivotal, transparent cover. A mounting base attaches to the compartment with a clamp structure that includes adjustable support straps being affixed to the mounting base. The support straps are used to affix the mounting base on the handlebars of a motorcycle or a bicycle.

U.S. Pat. No. 3,553,864, discloses a map holder that has a clear flat front and a flat back that are coupled together by a spring hinge. The outer surface of the front has a flatting agent to reduce glare and permit the surface to be written upon.

U.S. Pat. No. 2,729,908, discloses a map holder that includes an antiglare shield with a magnifying glass. U.S. Pat. No. 1,759,544, discloses a map holder that can be attached to a windshield using rubber suction cups. U.S. Pat. No. 2,791,040, discloses a map folio that includes a clear front.

A disadvantage of prior art map holders is that they usually do not permit simultaneous viewing of more than one page of a map. Another disadvantage of prior art map holders is that they often require folding and bending the map to retain the map therein. A further disadvantage of known map holders is that they do not include a retaining area for holding a multiple page map, such as a street atlas.

There is, therefore, a need for a map holding device that is adapted to retain a multiple page atlas, that further enables viewing of more than one page of the map, and includes means for locating a specific area on the page.

SUMMARY OF THE INVENTION

It is, therefore, an object of the present invention to provide an improved device for holding a map.

It is another object of the present invention to provide a map holding device adapted to hold a multiple page street atlas.

It is a further object of the present invention to provide a map holding device that provides enhanced viewing of a page of the map and enables simultaneous viewing of more than a single page of the map.

It is still another object of the present invention to provide a map holding device that includes a mechanism for locating a specific area on a page of the map.

These and other objects and advantages of the present invention are achieved by providing a street atlas holder. The holder includes a hollow transparent body dimensioned to hold a street atlas. The body includes a pair of handle members. One each of the handle members is affixed to a front and back wall of the body portion.

A cover is pivotally coupled to the body. The cover includes a magnifying lens. The magnifying lens is dimensioned to enable viewing of substantially an entire page of the street atlas while the magnification properties enhances viewing of the page. A retaining means is attached to a bottom surface of the cover to retain the page.

A locating mechanism for locating a specific area on the page of the street atlas is made integral with the cover and interposed between the retaining means and the magnifying lens. The locating mechanism includes a horizontal and a vertical adjustment mechanism that extend through the top surface of the cover and disposed adjacent opposite sides of the cover. The adjustment mechanisms are coupled to a moveable locating mechanism that includes a horizontal band and a vertical band that are adjusted horizontally and vertically over the page of the street atlas being viewed.

A target is coupled to the horizontal band and to the vertical band at an intersection thereof. The target is moved to a specific area on the page, when the bands are adjusted horizontally and vertically. The target is locatable over substantially all of the page being viewed.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

Figure 1:
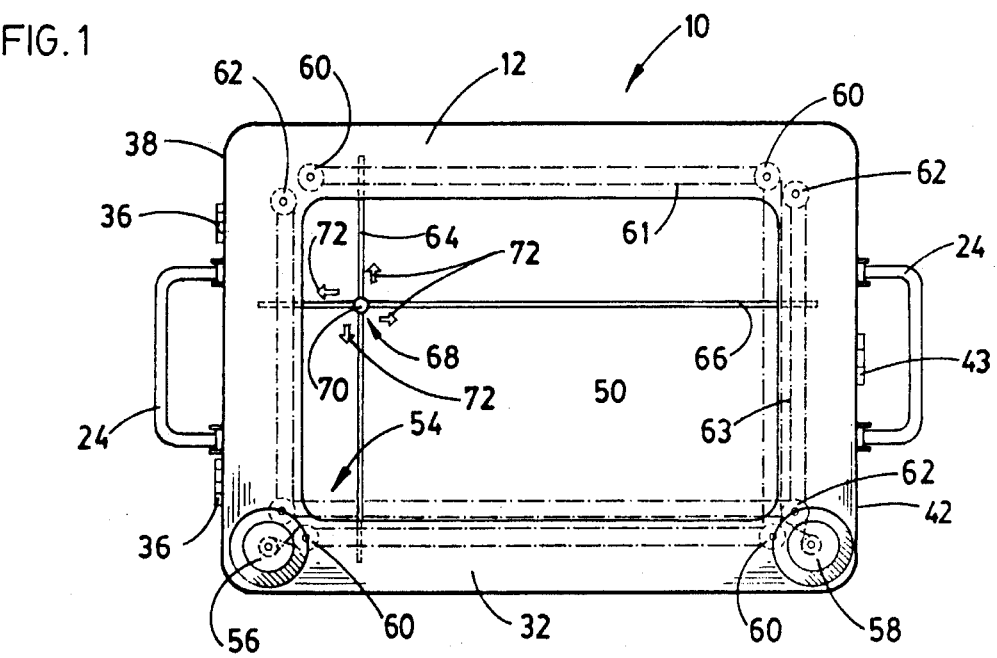
FIG. 1 is a top view of a preferred embodiment of the device of the present invention.
Figure 2:
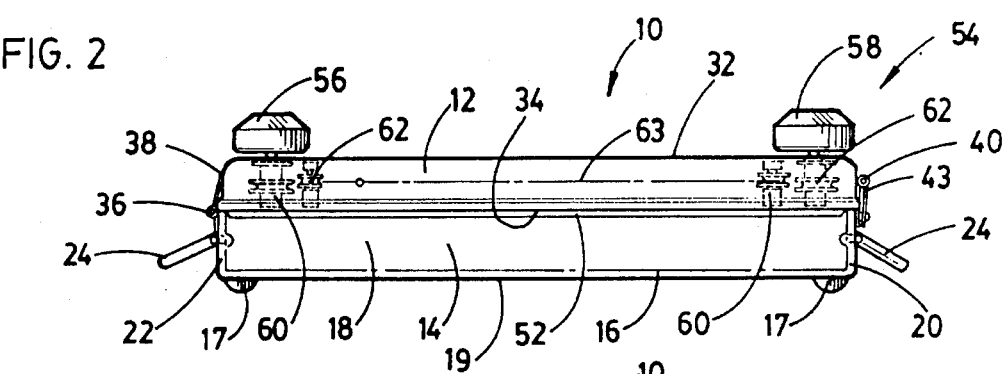
FIG. 2 is a side elevational view of the present invention.

The following description is provided to enable any person skilled in the art to make and 5 use the invention and sets forth the best modes contemplated by the inventor of carrying out his invention. Various modifications, however, will remain readily apparent to those skilled in the art, since the generic principles of the present invention have been defined herein specifically to provide for an improved and simplified device for holding and viewing a multiple page atlas.

Referring now to the drawing Figures, there is shown a street atlas holder 10, constructed according to the principles of the present invention. The atlas holder 10 includes a cover 12 and a hollow, transparent body portion 14. The body 14 includes a substantially rectangular bottom 16, a pair of side walls 18, a front wall 20, and a back wall 22. The bottom 16 and walls 18, 20, 22 are dimensioned to retain a street atlas (not shown). In the preferred embodiment, the body 14 is sized to accommodate a street atlas that is substantially 10 inches in length, 8 inches in width, and 1 inch in thickness. However, the body 14 may be sized to hold any desired atlas. The transparency of the body 14 enables viewing of a page of the street atlas through the bottom 16.

The body 14 may comprise any suitable light, rigid, transparent material. In the preferred embodiment 10, body 14 comprises a rigid, transparent plastic. The walls 18, 20, 22 are formed integrally with the bottom 16 using any method suitable to the material used to fabricate the body 14, and which does not inhibit viewing of a page of an atlas held in the body 14 through the bottom 16.

A foot member 17 may be affixed adjacent to each corner of an outer surface 19 of the bottom 16. The foot member 17 may comprise any material, such as rubber or plastic, that limits slippage between the atlas holder 10 and a surface it may be placed on.

A pair of handles 24 are provided for holding and carrying the atlas holder 10. One handle 24 is affixed to an outer surface 26 of the front wall 20 and the other handle 24 is affixed to an outer surface 26 of the back wall 22. The handles 24 may be affixed to the walls 20, 22 using a hinge (not shown) or other means, such that they are downwardly or upwardly foldable, for storing the atlas holder 10 for example.

The cover 12 is pivotally coupled to the body 14. The cover 12 has a top surface 32 and a bottom surface 34. The cover 12 is dimensioned to substantially cover the body 14 and may comprise any suitable light, rigid plastic or similar material.

The cover 12 is coupled to the body 14 using hinge means 36. In the preferred embodiment, a pair hinge members 36 are affixed to the body's back wall 22 and to a back wall 38 of the cover 12. A hinge member 36 is affixed to the back wall 22 on either side of the handle 24.

A securing means 40 is affixed to a front wall 42 of the cover 12 and to the outer surface 26 of the body's front wall 20. In the preferred embodiment, the securing means 40 includes a hinge portion 43 that is snap-fit onto a tab portion 44, for detachably securing the cover 12 to the body 14. The securing means 40 may comprise any suitable interlocking mechanism that prevents the atlas holder 10 from accidentally opening, causing a street atlas retained in the body 14 to be dislodged therefrom.

The cover 12 includes a transparent magnifying lens 50 (best seen in FIG. 1 ). The lens 50 is dimensioned to enable viewing of substantially an entire page of a street atlas. The magnification properties of the lens 50 enhance viewing of information on the page.

Figure 3:
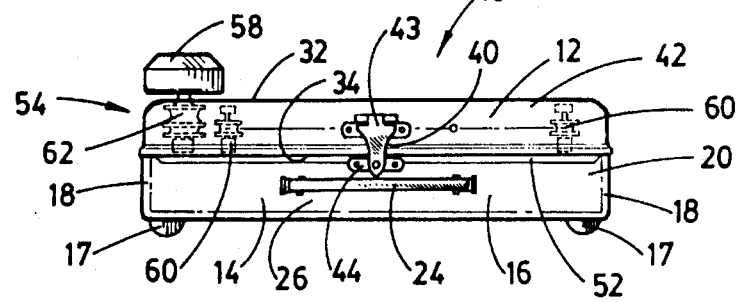
FIG. 3 is a front plan view of the present invention.
Figure 4:
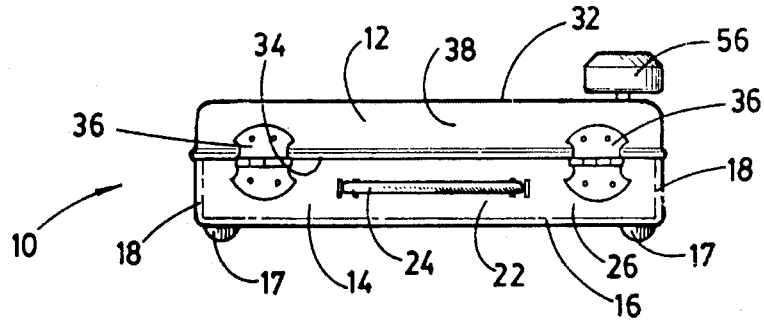
FIG. 4 is a back plan view of the plan of the preferred embodiment of the device of the present invention.

A retaining means 52 (best seen in FIG. 3) is attached to the bottom surface 34 of the cover 12, to retain the page therein. The retaining means 52 comprises a downwardly extending portion disposed adjacent to the back wall 38 of the cover 12. The retaining means aligns and retains the page of the street atlas in view of a user through the magnifying lens 50.

A locating means is shown generally at 54. The locating means 54 is used to locate a specific area on the page of the street atlas. The locating means 54 is made integral with the cover 12. The locating means 54 includes first and second adjustment means, such as knobs 56, 58 that are coupled to first and second drive means, such as pulley-cable systems 60, 62, respectively. A vertical band 64 is connected to cables 61 of the first cable-pulley system 60, and a horizontal band 66 is connected to cables 63 of the second cable-pulley system 62. The bands 64,66 are interposed between the lens 50 and retaining means 52. The first adjustment knob 56 is used to operate the first cable-pulley system 60 for adjusting the vertical band 64 horizontally across the lens 50. The second adjustment knob 58 operates the second cable-pulley system 62 for adjusting the horizontal band 66 vertically across the lens 50.

A target means 68, which comprises a targeting point 70 and directional arrows 72, is movably coupled to the horizontal band 66 and to the vertical band 64 at an intersection thereof. The target means 68 is coupled to the bands 64, 66, such that when either band 64, 66 is being adjusted, the target means 68 moves with the band 64, 66 that is being adjusted. When the bands 64, 66 are adjusted simultaneously, the target means 68 moves in a substantially diagonal direction, responsive to the directions in which the bands 64, 66 are being adjusted. The relative tension of the cable-pulley systems 61, 63 on the adjustment knobs 56, 58, prevents the knobs 56, 58 from moving freely. This inhibits the target means 68 from inadvertently moving from a desired location on the page of the street atlas.

Thus, there has been described an improved and simplified map holding device of the present invention. The disclosed invention is adapted to retain a multiple page atlas, and enables enhanced viewing of a page of a street atlas through the magnifying lens, while allowing viewing of an additional page of the atlas through the bottom of the transparent body. Further, the provided locating means enables locating and retaining a specific area on the page of the map to view through the magnifying lens.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A street atlas holding comprising:

a hollow body portion dimensioned to retain a street atlas therein;

said hollow body portion comprising a transparent flat rectangular bottom with transparent walls attached thereto, said transparent flat rectangular bottom and said transparent walls sized to hold a street atlas therein;

a cover pivotally coupled to said hollow body portion, said cover having a transparent magnifying lens sized to view a page of said street atlas therethrough, said cover having a top surface and bottom surface, and means for locating a specific area on a desired page of said street atlas made integral with said cover.

2. The street atlas holder of claim 2 further including a pair of handle members, one each of said handle members affixed to opposing ones of said walls.

3. The street atlas holder of claim 2 wherein said handle members are foldably attached to said walls.

4. The street atlas holder of claim 1 further including means for securing said cover to said body portion.

5. A street atlas holder comprising:

a hollow body portion dimensioned to retain a street atlas therein;

a cover pivotally coupled to the body portion, said cover having a transparent magnifying lens sized to view a page of said street atlas therethrough, said cover having a top surface and a bottom surface;

said cover further including a retaining means attached to the bottom surface of said cover for retaining a page of said street atlas therein; and means for locating a specific area on a desired page of said street atlas made integral with said cover.

6. A street atlas holder comprising:

a hollow body portion dimensioned to retain a street atlas therein;

a cover pivotally coupled to the body portion, said cover having a transparent magnifying lens sized to view a page of said street atlas therethrough, said cover having a top surface and a bottom surface;

means for locating a specific area on a desired page of said street atlas made integral with said cover;

said area locating means comprises an adjustment means attached to and extending through the top surface of said cover to said bottom surface and a moveable locating mechanism including a target coupled to said adjustment means, said moveable locating mechanism adapted to move the target to a specific area on said page, said adjustment means adapted to move said target horizontally, vertically, and diagonally over said page.

7. A street atlas holder comprising:

a hollow transparent body portion dimensioned to retain a street atlas therein;

a cover pivotally coupled to the body portion, said cover having a top surface and a bottom surface, said cover having a transparent magnifying lens therein sized to enable enhanced viewing of a page of said street atlas, said cover further including retaining means affixed to the bottom surface thereof for retaining the page of said street atlas therein; and means for locating a specific area on the page of said street atlas made integral with said cover, said locating means including adjustment means extending through the top surface of said cover and a movable locating mechanism interposed between said retaining means and said magnifying lens.

8. The street atlas holder of claim 7 wherein said locating means comprises;

a horizontal and a vertical adjustment means extending through the top surface of said cover and disposed adjacent opposite sides thereof;

said moveable locating mechanism coupled to said adjustment means, said locating mechanism including a first cable-pulley system coupled to the horizontal adjustment means and to a horizontal band for moving said band vertically over a page of said street atlas and a second cable-pulley system coupled to the vertical adjustment means and to a vertical band for moving said band horizontally across the page of said street atlas; and a target coupled to the horizontal band and to the vertical band at an intersection thereof to move said target to a specific area on said page when said bands are adjusted horizontally and vertically, said target being moveable along substantially all of the length of said bands.

9. The street atlas holder of claim 8 further including means for securing said cover to said body portion.

10. The street atlas holder of claim 7 wherein said hollow body portion comprises a transparent flat rectangular bottom with transparent side walls, a transparent front wall, and a transparent back wall attached thereto, said bottom and said walls sized to hold a street atlas therein.

11. The street atlas holder of claim 10 further including a pair of handle members, one each of said handle members foldably affixed to said front wall and said back wall.

12. A street atlas holder comprising:

a hollow transparent body portion dimensioned to retain a street atlas therein, said body portion comprising a flat rectangular bottom with transparent side walls, a transparent front wall, and a transparent back wall attached thereto, said body portion further including a pair of handle members, one each of said handle members affixed to said front wall and said back wall, said body portion being transparent to enable viewing of a first page of said street atlas therethrough;

a cover pivotally coupled to the body portion, said cover having a top surface and a bottom surface, said cover having a transparent magnifying lens therein dimensioned to enhance viewing of a second page of said street atlas, said cover further including a retaining means attached to the bottom surface thereof to retain said second page therein;

locating means for locating a specific area on said second page of said street atlas made integral with said cover and interposed between said retaining means and said magnifying lens, said locating means including horizontal and vertical adjustment means extending through the top surface of said cover and disposed adjacent opposite sides thereof, said adjustment means coupled to a moveable locating mechanism that includes a horizontal band and a vertical band adapted to be adjusted vertically and horizontally over said second page of said street atlas; and a target coupled to the horizontal band and to the vertical band at an intersection thereof for moving said target to a specific area on said second page when said bands are adjusted horizontally and vertically, said target being locatable over substantially all of the length of said bands.

13. The street atlas holder of claim 12 wherein said locating means further comprises a first cable-pulley system coupled to the horizontal adjustment means and to the horizontal band for moving said band vertically over the page of said street atlas and a second cable-pulley system coupled to the vertical adjustment means and to the vertical band for moving said band horizontally across the page of said street atlas.

14. The street atlas holder of claim 12 further including means for securing said cover to said body portion.

15. The street atlas holder of claim 12 further including a foot member affixed adjacent to each corner of an outer surface of the bottom of said body portion for limiting slippage between said street atlas holder and a surface.

* * * * *